United States Patent
Li et al.

(10) Patent No.: US 10,467,179 B2
(45) Date of Patent: Nov. 5, 2019

(54) METHOD AND DEVICE FOR SHARING PCIE I/O DEVICE, AND INTERCONNECTION SYSTEM

(71) Applicant: Huawei Technologies Co., Ltd., Shenzhen (CN)

(72) Inventors: Feng Li, Hangzhou (CN); Fan Fang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 216 days.

(21) Appl. No.: 15/405,908

(22) Filed: Jan. 13, 2017

(65) Prior Publication Data

US 2017/0124018 A1 May 4, 2017

Related U.S. Application Data

(63) Continuation of application No. PCT/CN2014/082263, filed on Jul. 15, 2014.

(51) Int. Cl.
  *G06F 13/24* (2006.01)
  *G06F 13/42* (2006.01)

(52) U.S. Cl.
  CPC .......... *G06F 13/4282* (2013.01); *G06F 13/24* (2013.01); *G06F 2213/0026* (2013.01)

(58) Field of Classification Search
  CPC .......... G06F 13/4282; G06F 13/24; G06F 2213/0026
  See application file for complete search history.

(56) References Cited

U.S. PATENT DOCUMENTS

| | | | |
|---|---|---|---|
| 9,535,849 B2 | 1/2017 | Kegel et al. | |
| 2006/0253619 A1* | 11/2006 | Torudbakken | G06F 13/4022 710/31 |
| 2009/0133028 A1 | 5/2009 | Brown et al. | |
| 2010/0146620 A1 | 6/2010 | Simeral et al. | |
| 2011/0055433 A1* | 3/2011 | Kishore | G06F 13/4022 710/9 |
| 2012/0166690 A1* | 6/2012 | Regula | G06F 13/404 710/104 |

(Continued)

FOREIGN PATENT DOCUMENTS

| | | |
|---|---|---|
| CN | 103077148 A | 5/2013 |
| CN | 103873489 A | 6/2014 |
| WO | 2012087648 A2 | 6/2012 |

*Primary Examiner* — Tim T Vo
*Assistant Examiner* — Herve Iradukunda
(74) *Attorney, Agent, or Firm* — Slater Matsil, LLP

(57) ABSTRACT

A method and a device for sharing a PCIe I/O device, and an interconnection system are provided. The method includes: determining a shared PCIe I/O device in a PCIe interconnection system; establishing, by using a BAR at a working node, a first mapping relationship between an address of a CSR of the shared PCIe I/O device and an address, used for processing the CSR, in a working node domain. The method also includes establishing, by using an A-LUT fragment at a management node side of the NTB, a second mapping relationship between an address, used for receiving an MSI-X interrupt of the shared PCIe I/O device, in a management node domain and an address, used for processing the MSI-X interrupt, in the working node domain.

12 Claims, 3 Drawing Sheets

(56) References Cited

U.S. PATENT DOCUMENTS

2014/0331223 A1* 11/2014 Lee ................. G06F 13/105
                                                        718/1
2015/0143016 A1*  5/2015 Egi ................. G06F 13/32
                                                       710/313

* cited by examiner

METHOD AND DEVICE FOR SHARING PCIE I/O DEVICE, AND INTERCONNECTION SYSTEM

CROSS-REFERENCE TO RELATED APPLICATIONS

This application is a continuation of International Application No. PCT/CN2014/082263, filed on Jul. 15, 2014, the disclosure of which is hereby incorporated by reference in its entirety.

TECHNICAL FIELD

The present invention relates to the field of a high-speed interconnection system, and in particular to, a method and a device for sharing a PCIe I/O device, and an interconnection system.

BACKGROUND

With development of Ethernet interconnection and Infini-Band technologies, an interconnection system of a PCIe Fabric formed based on peripheral component interconnect express (PCIe) has appeared. The interconnection system of the PCIe Fabric, also referred to as a PCIe interconnection system, generally includes one management node and N working nodes, each node belongs to an independent domain, and the connection and the address isolation between different domains are implemented using a non-transparent bridge (NTB) A peripheral component interconnect express input/output (PCIe I/O) device provided to and shared by each working node is usually set in a domain in which the management node is located.

In a system based on a PCIe Fabric interconnection structure, a domain in which a working node is located and a domain in which the PCIe I/O device is located implement address isolation by using the NTB. To enable the working node to use the PCIe I/O device, configuration initialization needs to be performed on the NTB, so that the working node manages the PCIe I/O device, and a message-signaled interrupts extended (MSI-X) interrupt of the PCIe I/O device is transmitted from the domain in which the management node is located to the domain in which the working node is located.

In the prior art, to share a shared PCIe I/O device, each base address register (BAR) at a working node side of the NTB needs to be mapped to one control and status register (CSR) of a device; and a BAR at a management node side of the NTB needs to be mapped to a large continuous memory area used as an memory area for receiving an MSI-X message.

After studying the prior art, the inventor finds that a size of a BAR corresponding to an NTB at each working node in a PCIe interconnection system is determined by a quantity of shared PCIe I/O devices, and needs to be set when the PCIe interconnection system is initialized, and when the PCIe interconnection system is initialized, it cannot be predicted that how many shared PCIe I/O devices needs to be used by the working node. If a relatively small BAR is set in hardware, when multiple PCIe I/O devices need to be used, all MSI-X interrupts of the PCIe I/O devices may not be transmitted to the working node by using the BAR; and if a relatively large BAR is set, an address conflict may occur in an MSI-X interrupt of a PCIe I/O device in a working node domain and an MSI-X interrupt of a shared PCIe I/O device. It can be seen from the foregoing content that, when an existing method is used to implement sharing of a PCIe I/O device, a size of a BAR is difficult to be determined when a PCIe interconnection system is initialized

SUMMARY

Embodiments of the present invention provide a method for sharing a PCIe I/O device, a device for sharing the PCIe I/O device, and a PCIe interconnection system, so as to resolve a problem that a size of a BAR is difficult to be determined.

According to a first aspect, an embodiment of the present invention provides a method for sharing a PCIe input/output I/O device. The method includes: determining a shared PCIe I/O device in a PCIe interconnection system. The method also includes establishing, by using a base address register BAR at a working node side of a non-transparent bridge NTB, a first mapping relationship between an address, of a control and status register CSR of the shared PCIe I/O device, in a management node domain in the PCIe interconnection system and an address, used for processing the CSR, in a working node domain in the PCIe interconnection system. The method also includes establishing, by using an address lookup table A-LUT fragment at a management node side of the NTB, a second mapping relationship between an address, used for receiving a message-signaled interrupts extended MSI-X interrupt of the shared PCIe I/O device, in the management node domain and an address, used for processing the MSI-X interrupt, in the working node domain.

With reference to the first aspect, in a first possible implementation manner of the first aspect, the determining a shared PCIe I/O device in a PCIe interconnection system includes: obtaining the address, of the control and status register CSR of the shared PCIe I/O device, in the management node domain in the PCIe interconnection system and the address, used for receiving the message-signaled interrupts extended MSI-X interrupt of the shared PCIe I/O device, in the management node domain; and obtaining the address, used for processing the CSR, in the working node domain in the PCIe interconnection system and the address, used for processing the MSI-X interrupt, in the working node domain.

With reference to the first aspect or the first possible implementation manner of the first aspect, in a second possible implementation manner of the first aspect, the establishing, by using an address lookup table A-LUT fragment at a management node side of the NTB, a second mapping relationship between an address, used for receiving a message-signaled interrupts extended MSI-X interrupt of the shared PCIe I/O device, in the management node domain and an address, used for processing the MSI-X interrupt, in the working node domain includes: enabling an A-LUT function of the NTB by using an A-LUT control register; selecting the A-LUT fragment, used for establishing the second mapping relationship, at the management node side of the NTB; and establishing the second mapping relationship by using the A-LUT fragment.

With reference to the second possible implementation manner of the first aspect, in a third possible implementation manner of the first aspect, the method further includes: obtaining a DMA address, allocated to the shared PCIe I/O device, in the management node domain, and a DMA address, allocated to the shared PCIe I/O device, in the working node domain; and establishing, by using the A-LUT fragment, a third mapping relationship between the DMA address, allocated to the shared PCIe I/O device, in the management node domain and the DMA address, allocated to the shared PCIe I/O device, in the working node domain.

According to a second aspect, an embodiment of the present invention provides an apparatus for sharing a PCIe I/O device. The apparatus includes: a determining unit, configured to determine a shared PCIe I/O device in a PCIe interconnection system. The apparatus also includes a mapping unit, configured to: establish, by using a base address register BAR at a working node side of a non-transparent bridge NTB, a first mapping relationship between an address, of a control and status register CSR of the shared PCIe I/O device, in a management node domain in the PCIe interconnection system and an address, used for processing the CSR in a working node domain in the PCIe interconnection system; and establish, by using an address lookup table A-LUT fragment at a management node side of the NTB, a second mapping relationship between an address, used for receiving an MSI-X interrupt of the shared PCIe I/O device, in the management node domain and an address, used for processing the MSI-X interrupt, in the working node domain.

With reference to the second aspect, in a first possible implementation manner of the second aspect, the determining unit is specifically configured to: obtain the address, of the control and status register CSR of the shared PCIe I/O device, in the management node domain in the PCIe interconnection system and the address, used for receiving the message-signaled interrupts extended MSI-X interrupt of the shared PCIe I/O device, in the management node domain; and obtain the address, used for processing the CSR, in the working node domain in the PCIe interconnection system and the address, used for processing the MSI-X interrupt, in the working node domain.

With reference to the second aspect or the first possible implementation manner of the second aspect, in a second possible implementation manner of the second aspect, the mapping unit includes: an enabling subunit, configured to enable an A-LUT function of the NTB by using an A-LUT control register; a selection subunit, configured to select the A-LUT fragment, used for establishing the second mapping relationship, at the management node side of the NTB; and a mapping subunit, configured to establish the second mapping relationship by using the A-LUT fragment.

With reference to the second possible implementation manner of the second aspect, in a third possible implementation manner of the second aspect, the determining unit is further configured to obtain a DMA address, allocated to the shared PCIe I/O device, in the management node domain, and a DMA address, allocated to the shared PCIe I/O device, in the working node domain; and the mapping unit is further configured to establish, by using the A-LUT fragment, a third mapping relationship between the DMA address, allocated to the shared PCIe I/O device, in the management node domain and the DMA address, allocated to the shared PCIe I/O device, in the working node domain.

According to a third aspect, an embodiment of the present invention provides an apparatus for sharing a PCIe I/O device. The apparatus includes a processor, a memory, a bus, and a communications interface, where the memory is configured to store a computer executable instruction; and the processor is connected to the memory by using the bus. When the apparatus is run, the processor executes the computer executable instruction stored in the memory to enable the apparatus to perform the following method: determining a shared PCIe I/O device in a PCIe interconnection system; establishing, by using a base address register BAR at a working node side of a non-transparent bridge NTB, a first mapping relationship between an address, of a control and status register CSR of the shared PCIe I/O device, in a management node domain in the PCIe interconnection system and an address, used for processing the CSR, in a working node domain in the PCIe interconnection system; and establishing, by using an address lookup table A-LUT fragment at a management node side of the NTB, a second mapping relationship between an address, used for receiving a message-signaled interrupts extended MSI-X interrupt of the shared PCIe I/O device, in the management node domain and an address, used for processing the MSI-X interrupt, in the working node domain.

With reference to the third aspect, in a first possible implementation manner of the third aspect, in the method performed by the apparatus when the processor executes the computer executable instruction stored in the memory, the determining a shared PCIe I/O device in a PCIe interconnection system includes: obtaining the address, of the control and status register CSR of the shared PCIe I/O device, in the management node domain in the PCIe interconnection system and the address, used for receiving the message-signaled interrupts extended MSI-X interrupt of the shared PCIe I/O device, in the management node domain; and obtaining the address, used for processing the CSR, in the working node domain in the PCIe interconnection system and the address, used for processing the MSI-X interrupt, in the working node domain.

With reference to the third aspect or the first possible implementation manner of the third aspect, in a second possible implementation manner of the third aspect, in the method performed by the apparatus when the processor executes the computer executable instruction stored in the memory, the establishing, by using an address lookup table A-LUT fragment at a management node side of the NTB, a second mapping relationship between an address, used for receiving a message-signaled interrupts extended MSI-X interrupt of the shared PCIe I/O device, in the management node domain and an address, used for processing the MSI-X interrupt, in the working node domain includes: enabling an A-LUT function of the NTB by using an A-LUT control register; selecting the A-LUT fragment, used for establishing the second mapping relationship, at the management node side of the NTB; and establishing the second mapping relationship by using the A-LUT fragment.

With reference to the second possible implementation manner of the third aspect, in a third possible implementation manner of the third aspect, the method performed by the apparatus when the processor executes the computer executable instruction stored in the memory further includes: obtaining a DMA address, allocated to the shared PCIe I/O device, in the management node domain, and a DMA address, allocated to the shared PCIe I/O device, in the working node domain; and establishing, by using the A-LUT fragment, a third mapping relationship between the DMA address, allocated to the shared PCIe I/O device, in the management node domain and the DMA address, allocated to the shared PCIe I/O device, in the working node domain.

According to a fourth aspect, an embodiment of the present invention provides a PCIe I/O interconnection system. The interconnection system includes a working node, a management node, and a non-transparent bridge NTB. The working node is configured to: determine a shared PCIe I/O device allocated by the management node; establish, by using a BAR at a working node side of the NTB, a first mapping relationship between an address, of a control and status register CSR of the shared PCIe I/O device, in a management node domain in the interconnection system and an address, used for processing the CSR, in a working node domain in the interconnection system; establish, by using an address lookup table A-LUT fragment at a management node side of the NTB, a second mapping relationship between an address, used for receiving a message-signaled interrupts extended MSI-X interrupt of the shared PCIe I/O device, in the management node domain and an address, used for processing the MSI-X interrupt, in the working node domain; and configure an interrupt vector table for the shared PCIe I/O device.

According to a fifth aspect, an embodiment of the present invention provides a PCIe I/O interconnection system, where the interconnection system includes a working node, a management node, and a non-transparent bridge NTB. The management node is configured to: determine a shared PCIe I/O device allocated to the working node; establish, by using a BAR at a working node side of the NTB, a first mapping relationship between an address, of a control and status register CSR of the shared PCIe I/O device, in a management node domain in the interconnection system and an address, used for processing the CSR, in a working node domain in the interconnection system; and establish, by using an address lookup table A-LUT fragment at a management node side of the NTB, a second mapping relationship between an address, used for receiving a message-signaled interrupts extended MSI-X interrupt of the shared PCIe I/O device, in the management node domain and an address, used for processing the MSI-X interrupt, in the working node domain; and the working node is configured to set an interrupt vector table for the shared PCIe I/O device after the first mapping relationship and the second mapping relationship are established.

By means of the embodiments of the present invention, a shared PCIe I/O device in a PCIe interconnection system is determined; a first mapping relationship between an address, of a control and status register CSR of the shared PCIe I/O device, in a management node domain in the PCIe interconnection system and an address, used for processing the CSR, in a working node domain in the PCIe interconnection system is established by using a base address register BAR at a working node side of a non-transparent bridge NTB; and a second mapping relationship between an address, used for receiving a message-signaled interrupts extended MSI-X interrupt of the shared PCIe I/O device, in the management node domain and an address, used for processing the MSI-X interrupt, in the working node domain is established by using an address lookup table A-LUT fragment at a management node side of the NTB. Mapping of a shared PCIe I/O device is completed by using an A-LUT fragment, so that when a system is initialized, a size of an A-LUT fragment and a quantity of A-LUT fragments can be determined according to a quantity of sharable PCIe I/O devices, and a size of a BAR is determined; therefore, the size of the BAR can be determined quite easily and accurately.

BRIEF DESCRIPTION OF THE DRAWINGS

To describe the technical solutions in the embodiments of the present invention or in the prior art more clearly, the following briefly describes the accompanying drawings required for describing the embodiments or the prior art. Apparently, a person of ordinary skill in the art may still derive other drawings from these accompanying drawings without creative efforts.

DETAILED DESCRIPTION OF ILLUSTRATIVE EMBODIMENTS

To make a person skilled in the art understand the technical solutions in the present invention better, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
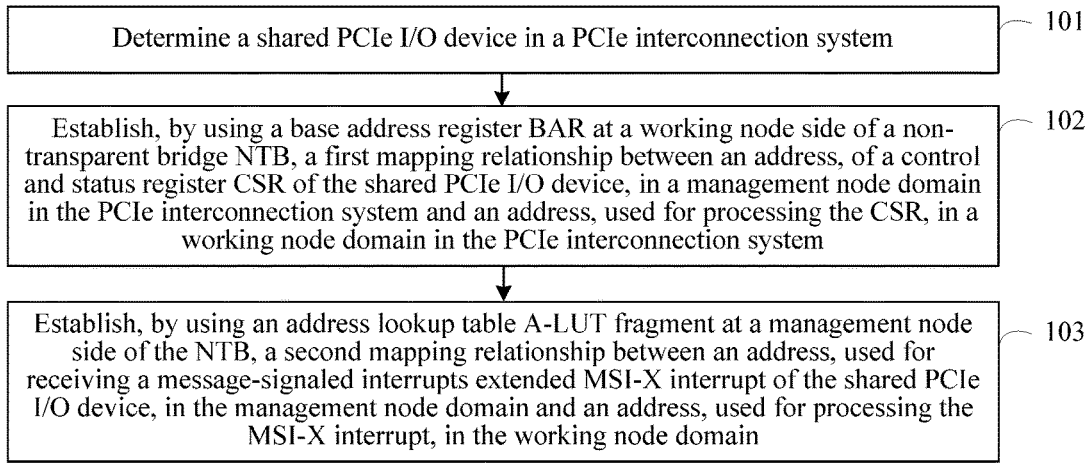
FIG. 1 is a flowchart of an embodiment of a method for sharing a PCIe I/O device according to the present invention.

FIG. 1 is a flowchart of an embodiment of a method for sharing a PCIe I/O device according to the present invention. As shown in FIG. 1, the method includes the following steps.

Step 101: Determine a shared PCIe I/O device in a PCIe interconnection system.

Determining, by a working node or a management node, a shared PCIe I/O device includes: obtaining an address, of a control and status register CSR of the shared PCIe I/O device, in a management node domain and an address, used for receiving a message-signaled interrupts extended MSI-X interrupt of the shared PCIe I/O device, in the management node domain; and obtaining an address, used for processing the CSR, in a working node domain and an address, used for processing the MSI-X interrupt, in the working node domain. To increase a data transmission speed between nodes, the working node or the management node may further obtain a direct memory access DMA (DMA) address, allocated to the shared PCIe I/O device, in the management node domain, and a DMA address, allocated to the shared PCIe I/O device, in the working node domain. Preferably, the management node determines a PCIe I/O device in the management node domain as a shared PCIe I/O device allocated to the working node. The management node may write the address, of the CSR of the shared PCIe I/O device, in the management node domain and the address, used for receiving the MSI-X interrupt of the shared PCIe I/O device, in the management node domain into a temporary register. The working node obtains the address of the CSR of the shared PCIe I/O device and the address used for receiving the MSI-X interrupt from the temporary register. The management node may further write the DMA address, allocated to the shared PCIe I/O device, in the management node domain and the address of the CSR and the address used for receiving the MSI-X interrupt into the temporary register, and the working node obtains the DMA address allocated to the shared PCIe I/O device. After the management node allocates the shared PCIe I/O device to the working node, the working node allocates, to the shared PCIe I/O device, the address, used for processing the CSR, in the working node domain and the address, used for processing the MSI-X interrupt, in the working node domain, and may further allocate, to the shared PCIe I/O device, the DMA address, allocated to the shared PCIe I/O device, in the working node domain. The foregoing addresses are allocated by the working node or are determined when the PCIe interconnection system is initialized.

Step 102: Establish, by using a base address register BAR at a working node side of a non-transparent bridge NTB, a first mapping relationship between an address, of a control and status register CSR of the shared PCIe I/O device, in a management node domain in the PCIe interconnection system and an address, used for processing the CSR, in a working node domain in the PCIe interconnection system.

Establishment of the first mapping relationship is similar to a manner of establishing, by using the BAR at the working node side of the NTB, a mapping relationship between the address of the CSR of the shared PCIe I/O device and the address, used for processing the CSR, in the working node domain in the prior art. This is not described in detail herein again.

Step 103: Establish, by using an address lookup table A-LUT fragment at a management node side of the NTB, a second mapping relationship between an address, used for receiving a message-signaled interrupts extended MSI-X interrupt of the shared PCIe I/O device, in the management node domain and an address, used for processing the MSI-X interrupt, in the working node domain.

In a possible implementation manner, the working node or the management node first enables an A-LUT function of the NTB by using an address lookup table (A-LUT) control register; selects the A-LUT fragment, used for establishing the second mapping relationship, at the management node side of the NTB; and establishes the second mapping relationship by using the selected A-LUT fragment.

To increase a data transmission speed between the working node domain and the management node domain, the working node or the management node may further obtain the DMA address, allocated to the shared PCIe I/O device, in the management node domain and the DMA address, allocated to the shared PCIe I/O device, in the working node domain; and after the first mapping relationship and the second mapping relationship are established, may further establish, by using the selected A-LUT fragment, a third mapping relationship between the DMA address, allocated to the shared PCIe I/O device, in the management node domain and the DMA address, allocated to the shared PCIe I/O device, in the working node domain.

After the first mapping relationship and the second mapping relationship are established, the working node may configure an interrupt vector table for the shared PCIe I/O device according to the first mapping relationship and the second mapping relationship, thereby completing sharing of the shared PCIe I/O device.

It should be noted herein that both the first mapping relationship and the second mapping relationship may be established by the working node, or may be established by the management node, or may be separately established by the two nodes. Similarly, the third mapping relationship may also be established by either of the two nodes.

In this embodiment, a shared PCIe I/O device in a PCIe interconnection system is determined; a first mapping relationship between an address, of a control and status register CSR of the shared PCIe I/O device, in a management node domain in the PCIe interconnection system and an address, used for processing the CSR, in a working node domain in the PCIe interconnection system is established by using a base address register BAR at a working node side of a non-transparent bridge NTB; and a second mapping relationship between an address, used for receiving a message-signaled interrupts extended MSI-X interrupt of the shared PCIe I/O device, in the management node domain and an address, used for processing the MSI-X interrupt, in the working node domain is established by using an address lookup table A-LUT fragment at a management node side of the NTB. Mapping of a shared PCIe I/O device can be completed by using an A-LUT fragment, so that when a system is initialized, a size of an A-LUT fragment and a quantity of A-LUT fragments can be determined according to a quantity of sharable PCIe I/O devices, and a size of a BAR is determined. Not only the size of the BAR can be determined quite easily and accurately, but also occupation of relatively large memory space can be avoided by setting a relatively small BAR in general cases.

Figure 2:
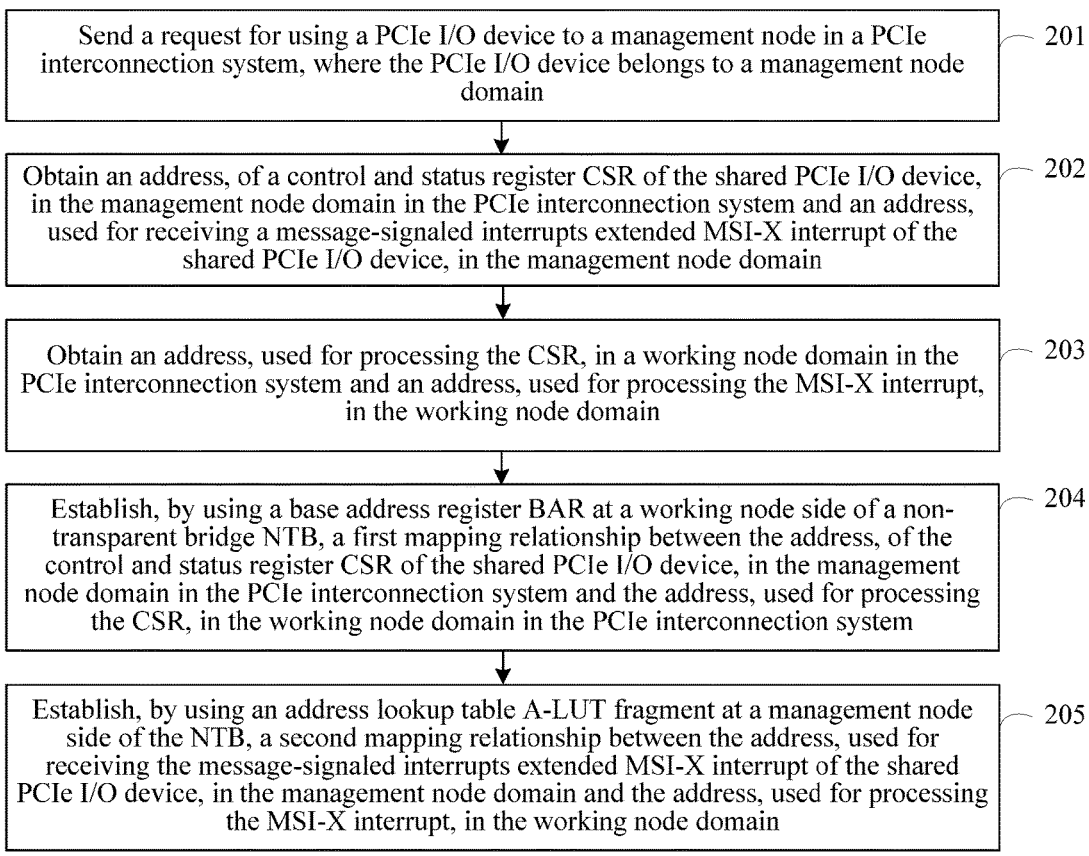
FIG. 2 is a flowchart of another embodiment of a method for sharing a PCIe I/O device according to the present invention.

FIG. 2 is a flowchart of an embodiment of a method for sharing a PCIe I/O device according to the present invention. A working node may configure an NTB in a manner in this embodiment, so as to share a shared PCIe I/O device. As shown in FIG. 2, the method includes the following steps.

Step 201: Send a request for using a PCIe I/O device to a management node in a PCIe interconnection system, where the PCIe I/O device belongs to a management node domain.

A working node sends, to the management node by writing a temporary register of an NTB device, the request for using the PCIe I/O device that belongs to the management node domain. After the request is written into the temporary register, the working node writes a corresponding interrupt bit of a doorbell register at a management node side of the NTB device, and generates an MSI interrupt in the management node, so as to notify the management node that the working node requests to use the shared PCIe I/O device.

Step 202: Obtain an address, of a control and status register CSR of the shared PCIe I/O device, in the management node domain in the PCIe interconnection system and an address, used for receiving a message-signaled interrupts extended MSI-X interrupt of the shared PCIe I/O device, in the management node domain.

After receiving the request, the management node first uses a PCIe I/O device in the management node domain as a shared PCIe I/O device, and allocates the shared PCIe I/O device to the working node. The management node may write an address (address A for short below) of a CSR of the shared PCIe I/O device in the management node domain and an address (address C for short below), used for receiving an MSI-X interrupt of the shared PCIe I/O device, in the management node domain into the temporary register. The working node obtains the address A and the address C from the temporary register. It should be noted herein that the management node may further write a DMA address (address E for short below), allocated to the shared PCIe I/O device, in the management node domain into the temporary register together with the address A and the address C, so that the working node obtains the address E when obtaining the address A and the address C.

Step 203: Obtain an address, used for processing the CSR, in a working node domain in the PCIe interconnection system and an address, used for processing the MSI-X interrupt, in the working node domain.

After the management node allocates the shared PCIe I/O device to the working node, the working node needs to allocate, to the shared PCIe I/O device, the address (address B for short below), used for processing the CSR, in the working node domain and the address (address D for short below), used for processing the MSI-X interrupt, in the working node domain, and may further allocate, to the shared PCIe I/O device, a DMA address (address F for short below), allocated to the shared PCIe I/O device, in the working node domain. The address B, the address D and the address F are allocated by the working node or are determined when the PCIe interconnection system is initialized.

Step 204: Establish, by using a base address register BAR at a working node side of a non-transparent bridge NTB, a first mapping relationship between the address, of the control and status register CSR of the shared PCIe I/O device, in the management node domain in the PCIe interconnection system and the address, used for processing the CSR, in the working node domain in the PCIe interconnection system.

Step 205: Establish, by using an address lookup table A-LUT fragment at a management node side of the NTB, a second mapping relationship between the address, used for receiving the message-signaled interrupts extended MSI-X interrupt of the shared PCIe I/O device, in the management node domain and the address, used for processing the MSI-X interrupt, in the working node domain.

An A-LUT function of the NTB device can be enabled or disabled by using an A-LUT control register. Before the A-LUT fragment is used, the A-LUT function of the NTB may be first enabled by using the A-LUT control register.

Before the A-LUT of the NTB device is used, the A-LUT needs to be configured and an A-LUT address space is determined by an address space of a corresponding BAR. In general cases, a maximum quantity of A-LUT fragments of a BAR of the NTB device is 128/256, where the quantity of fragments is set and determined by an EEPROM of the NTB device according to use of the NTB. When the A-LUT function is used, a fragment that is not used at the management node side of the NTB may be selected as the selected A-LUT fragment used for establishing the second mapping relationship.

When the NTB has the A-LUT, if a reading or writing operation falls within an address in the A-LUT, the NTB first queries the A-LUT address lookup table, and correspondingly changes an address according to content of the A-LUT. A conversion formula may be the formula shown below: FinalAddr={RemapAddr[63:S],InitialAddr[S-1:0]}, where FinalAddr refers to a destination address obtained by using the address A-LUT of the NTB, RemapAddr is saved in the A-LUT and is divided into a first half of a mapping address and a second half of the mapping address of the A-LUT fragment, InitialAddr refers to a source address that is converted by using the NTB, and a size of the A-LUT is 2 raised to the power of S.

An address of each MSI-X interrupt is mapped, by using the A-LUT function of the NTB device, to an address for receiving the MSI-X interrupt in the working node that uses the I/O device, so that the MSI-X interrupt can be transmitted from the management node domain to the working node domain that uses the I/O device, and an adverse effect caused by mapping of a large segment of MSI-X address is avoided.

When there are multiple shared PCIE I/O devices, an MSI-X interrupt of each shared PCIE I/O device may separately use one A-LUT fragment. MSI-X interrupts of different shared PCIE I/O devices may be mapped by using different A-LUT fragments, so as to improve use efficiency of the address lookup table, and increase a quantity of shared PCIE I/O devices that can be used by the working node. When the PCIe interconnection system is a heterogeneous system, address mapping may also be performed quite conveniently between a 32-bit address and a 64-bit address.

If the working node further obtains the address C and the address F, a third mapping relationship between the address C and the address F may be further established, where the third mapping relationship may also be established by using the A-LUT fragment. The third mapping relationship is established, so that direct data transmission can be implemented between the management node domain and the working node domain, thereby improving data transmission efficiency. A specific process is not described in detail herein again. The third mapping relationship may also be established by using the selected fragment. A specific process of establishing the third mapping relationship is not described in detail herein again. It should be noted herein that an establishment sequence of the first mapping relationship, the second mapping relationship, and the third mapping relationship is not limited in the present invention, and the first mapping relationship may also be established by using the selected fragment.

After the mapping relationship and the second mapping relationship are established, the shared PCIe I/O device is mapped as a virtual PCIe I/O device. In this case, the working node configures a related register and completes configuration initialization on a CSR of the virtual PCIe I/O device, so as to complete configuration on an MSI-X interrupt vector table of the shared PCIe I/O device and configuration on an interrupt descriptor, and bind an interrupt number with an interrupt processing program. After configuration on the interrupt vector table is completed, the working node may use a process the same as a process used by the PCIe I/O device in the working node domain to use the shared PCIe I/O device. A process in which the working node performs configuration initialization on the shared PCIe I/O device is similar with a process in which the working node performs configuration initialization on the PCIe I/O device in the working node domain. This is not described in detail herein again.

By means of this embodiment, mapping of a shared PCIe I/O device can be completed by using an A-LUT fragment, so that when a system is initialized, a size of an A-LUT fragment and a quantity of A-LUT fragments can be determined according to a quantity of sharable PCIe I/O devices, and a size of a BAR is determined. Not only the size of the BAR can be determined quite easily and accurately, but also occupation of relatively large memory space can be avoided by setting a relatively small BAR in general cases.

Figure 3:
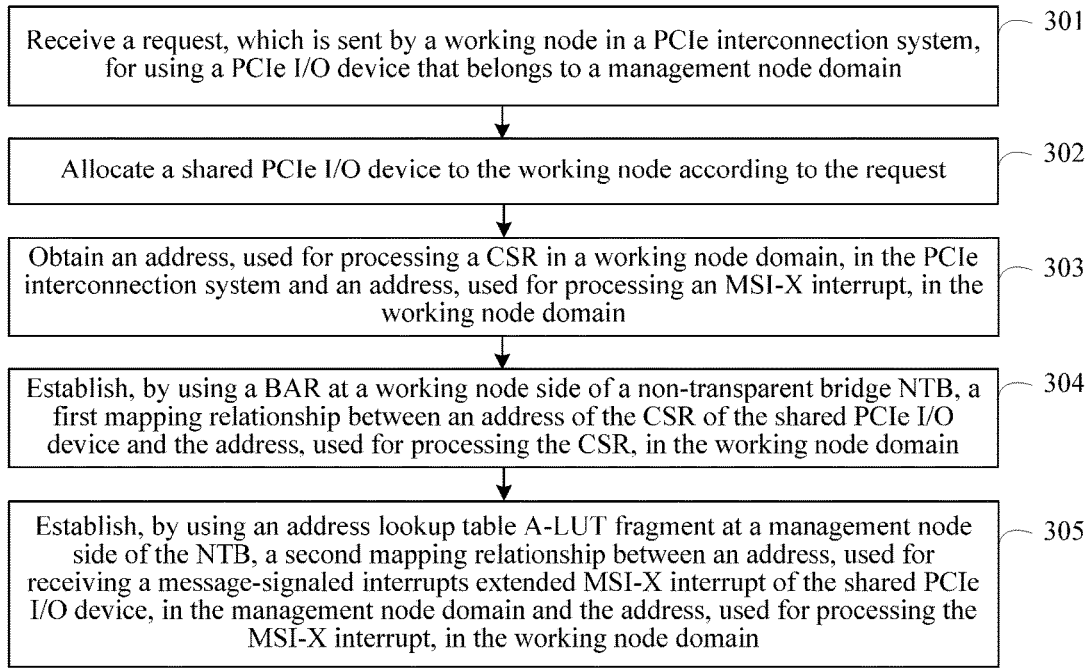
FIG. 3 is a flowchart of another embodiment of a method for sharing a PCIe I/O device according to the present invention.

Referring to FIG. 3, FIG. 3 is a flowchart of another embodiment of a method for sharing a PCIe I/O device according to the present invention. A management node may configure an NTB in a manner in this embodiment to share a shared PCIe I/O device. For convenience of description, in this embodiment, an example in which a PCIe interconnection system includes only one working node domain is used. As shown in FIG. 3, the method includes the following steps.

Step 301: Receive a request, which is sent by a working node in a PCIe interconnection system, for using a PCIe I/O device that belongs to a management node domain.

The working node may send, to a management node by writing a temporary register of an NTB device, the request for using the shared PCIe I/O device. After the request is written into the temporary register, the working node writes a corresponding interrupt bit of a doorbell register at a management node side of the NTB device, and generates an MSI interrupt in the management node, so as to notify the management node that the working node requests to use the shared PCIe I/O device. The request may include an address B and an address D, and may further include an address F.

Step 302: Allocate the shared PCIe I/O device to the working node according to the request.

After receiving the request, the management node allocates the shared PCIe I/O device to the working node. The allocating the shared PCIe I/O device to the working node includes: determining an address A and an address C of the shared PCIe I/O device, and may further include determining an address E.

Step 303: Obtain an address, used for processing a CSR in a working node domain, in the PCIe interconnection system and an address, used for processing an MSI-X interrupt, in the working node domain.

The management node may directly obtain the address B and the address D from the request, and may also instruct the working node to send the address B and the address D.

Step 304: Establish, by using a BAR at a working node side of a non-transparent bridge NTB, a first mapping relationship between an address of the CSR of the shared PCIe I/O device and the address, used for processing the CSR, in the working node domain.

Step 305: Establish, by using an address lookup table A-LUT fragment at a management node side of the NTB, a second mapping relationship between an address, used for receiving a message-signaled interrupts extended MSI-X interrupt of the shared PCIe I/O device, in the management node domain and the address, used for processing the MSI-X interrupt, in the working node domain.

After the first mapping relationship and the second mapping relationship are established, the working node configures a related register and completes configuration initialization on a CSR of a virtual PCIe I/O device, so as to complete configuration on an MSI-X interrupt vector table of the shared PCIe I/O device and configuration on an interrupt descriptor, and bind an interrupt number with an interrupt processing program. After configuration on the interrupt vector table is completed, the working node may use a process the same as a process used by the PCIe I/O device in the working node domain to use the shared PCIe I/O device.

By means of this embodiment, mapping of a shared PCIe I/O device can be completed by using an A-LUT fragment, so that when a system is initialized, a size of an A-LUT fragment and a quantity of A-LUT fragments can be determined according to a quantity of sharable PCIe I/O devices, and a size of a BAR is determined. Not only the size of the BAR can be determined quite easily and accurately, but also occupation of relatively large memory space can be avoided by setting a relatively small BAR in general cases.

Figure 4:
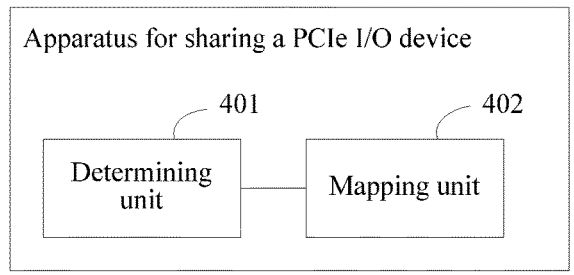
FIG. 4 is a structural diagram of an embodiment of an apparatus for sharing a PCIe I/O device according to the present invention.

Referring to FIG. 4, FIG. 4 is a schematic diagram of an embodiment of an apparatus for sharing a PCIe I/O device according to the present invention. The apparatus may be set in a working node, or may be set in a management node.

As shown in FIG. 4, the apparatus includes a determining unit 401 and a mapping unit 402.

The determining unit 401 is configured to determine a shared PCIe I/O device in a PCIe interconnection system.

In an optional implementation manner, the determining unit 401 may be configured to: obtain an address, of a control and status register CSR of the shared PCIe I/O device, in a management node domain in the PCIe interconnection system and an address, used for receiving a message-signaled interrupts extended MSI-X interrupt of the shared PCIe I/O device, in the management node domain; and obtain an address, used for processing the CSR, in a working node domain in the PCIe interconnection system and an address, used for processing the MSI-X interrupt, in the working node domain.

The mapping unit 402 is configured to: establish, by using a base address register BAR at a working node side of a non-transparent bridge NTB, a first mapping relationship between the address, of the control and status register CSR of the shared PCIe I/O device, in the management node domain in the PCIe interconnection system and the address, used for processing the CSR in the working node domain, in the PCIe interconnection system; and establish, by using an address lookup table A-LUT fragment at a management node side of the NTB, a second mapping relationship between the address, used for receiving the MSI-X interrupt of the shared PCIe I/O device, in the management node domain and the address, used for processing the MSI-X interrupt, in the working node domain.

In an optional implementation manner, the mapping unit may include: an enabling subunit, configured to enable an A-LUT function of the NTB by using an A-LUT control register; a selection subunit, configured to select the A-LUT fragment, used for establishing the second mapping relationship, at the management node side of the NTB; and a mapping subunit, configured to establish the second mapping relationship by using the A-LUT fragment.

In another optional implementation manner, the determining unit 401 is further configured to: obtain a DMA address, allocated to the shared PCIe I/O device, in the management node domain, and a DMA address, allocated to the shared PCIe I/O device, in the working node domain; and the mapping unit 402 is further configured to establish, by using the A-LUT fragment, a third mapping relationship between the DMA address, allocated to the shared PCIe I/O device, in the management node domain and the DMA address, allocated to the shared PCIe I/O device, in the working node domain.

By means of this embodiment, mapping of a shared PCIe I/O device can be completed by using an A-LUT fragment, so that when a system is initialized, a size of an A-LUT fragment and a quantity of A-LUT fragments can be determined according to a quantity of sharable PCIe I/O devices, and a size of a BAR is determined. Not only the size of the BAR can be determined quite easily and accurately, but also occupation of relatively large memory space can be avoided by setting a relatively small BAR in general cases.

Figure 5:
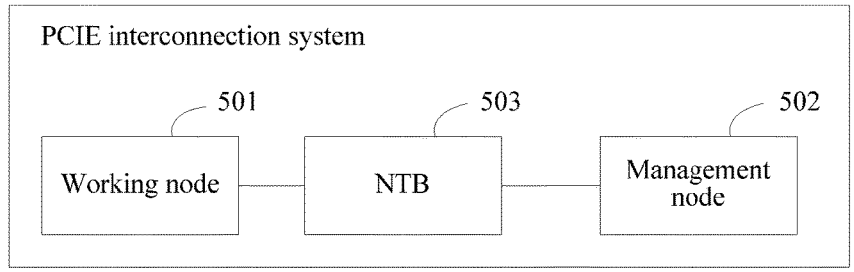
FIG. 5 is a structural diagram of an embodiment of a PCIe interconnection system according to the present invention.

Referring to FIG. 5, FIG. 5 is a schematic diagram of an embodiment of a PCIe interconnection system according to the present invention.

As shown in FIG. 5, the system includes a working node 501, a management node 502, and an NTB 503.

In an optional implementation manner, the working node 501 is configured to: determine a shared PCIe I/O device allocated by the management node 502; establish, by using a BAR at a working node side of the NTB 503, a first mapping relationship between an address of a CSR of the shared PCIe I/O device and an address, used for processing the CSR, in a working node domain; establish, by using an address lookup table A-LUT fragment at a management node side of the NTB 503, a second mapping relationship between an address, used for receiving a message-signaled interrupts extended MSI-X interrupt of the shared PCIe I/O device, in a management node domain and an address, used for processing the MSI-X interrupt, in the working node domain; and configure an interrupt vector table for the shared PCIe I/O device, so as to complete sharing of the shared PCIe I/O device.

In another optional implementation manner, the management node 502 is configured to: determine a shared PCIe I/O device allocated by the management node; establish, by using a BAR at a working node side of the NTB 503, a first mapping relationship between an address of a CSR of the shared PCIe I/O device and an address, used for processing the CSR, in a working node domain; and establish, by using an address lookup table A-LUT fragment at a management node side of the NTB 503, a second mapping relationship between an address, used for receiving a message-signaled interrupts extended MSI-X interrupt of the shared PCIe I/O device, in a management node domain and an address, used for processing the MSI-X interrupt, in the working node domain; and the working node 501 is configured to: after the first mapping relationship and the second mapping relationship are established, configure an interrupt vector table for the shared PCIe I/O device, so as to complete sharing of the shared PCIe I/O device.

By means of this embodiment, mapping of a shared PCIe I/O device can be completed by using an A-LUT fragment, so that when a system is initialized, a size of an A-LUT fragment and a quantity of A-LUT fragments can be determined according to a quantity of sharable PCIe I/O devices, and a size of a BAR is determined. Not only the size of the BAR can be determined quite easily and accurately, but also occupation of relatively large memory space can be avoided by setting a relatively small BAR in general cases.

Figure 6:
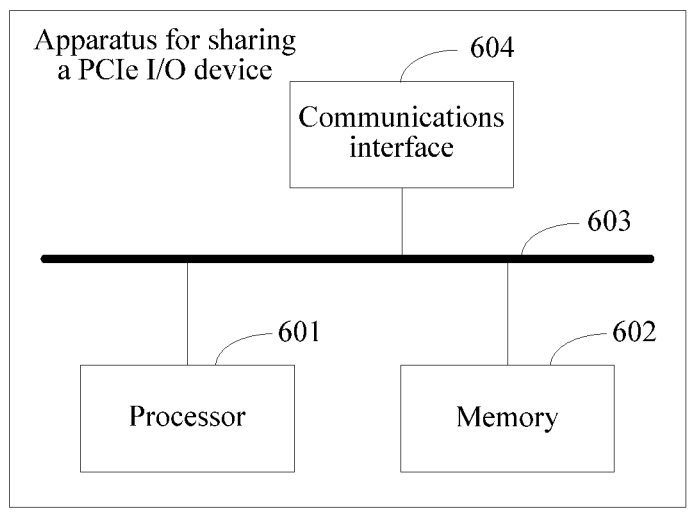
FIG. 6 is a structural diagram of another embodiment of an apparatus for sharing a PCIe I/O device according to the present invention.

Referring to FIG. 6, FIG. 6 is a schematic diagram of an apparatus for sharing a PCIe I/O device according to another embodiment of the present invention. The apparatus may be set in a working node, or may be set in a management node.

As shown in FIG. 6, the apparatus for sharing a PCIe I/O device includes modules such as a processor 601, a memory 602, and a communications interface 604, and the modules are connected to one another by using a bus 603.

The bus 603 may be a peripheral component interconnect (PCI) bus, an extended industry standard architecture (EISA) bus or the like. The bus may be classified into an address bus, a data bus, a control bus, and the like. For convenience of representation, only a bold line is used for representation in FIG. 6, but it does not represent that there is only one bus or one type of buses.

The memory 602 is configured to store a program. Specifically, the program may include program code, where the program code includes a computer executable instruction. The memory 602 may include a random access memory (RAM), and may further include a non-volatile memory, such as at least one magnetic disk storage.

When the apparatus is run, the processor 601 executes a computer executable instruction stored in the memory 602 to enable the apparatus to perform the following method: determining a shared PCIe I/O device in a PCIe interconnection system; establishing, by using a base address register BAR at a working node side of a non-transparent bridge NTB, a first mapping relationship between an address, of a control and status register CSR of the shared PCIe I/O device, in a management node domain in the PCIe interconnection system and an address, used for processing the CSR, in a working node domain in the PCIe interconnection system; and establishing, by using an address lookup table A-LUT fragment at a management node side of the NTB, a second mapping relationship between an address, used for receiving a message-signaled interrupts extended MSI-X interrupt of the shared PCIe I/O device, in the management node domain and an address, used for processing the MSI-X interrupt, in the working node domain.

Preferably, in the method performed by the apparatus when the processor 601 executes the computer executable instruction stored in the memory 602, the step of determining a shared PCIe I/O device in a PCIe interconnection system specifically includes: obtaining the address, of the control and status register CSR of the shared PCIe I/O device, in the management node domain in the PCIe interconnection system and the address, used for receiving the message-signaled interrupts extended MSI-X interrupt of the shared PCIe I/O device, in the management node domain; and obtaining the address, used for processing the CSR, in the working node domain in the PCIe interconnection system and the address, used for processing the MSI-X interrupt, in the working node domain.

Preferably, in the method performed by the apparatus when the processor 601 executes the computer executable instruction stored in the memory 602, the step of establishing, by using an address lookup table A-LUT fragment at a management node side of the NTB, a second mapping relationship between an address, used for receiving a message-signaled interrupts extended MSI-X interrupt of the shared PCIe I/O device, in the management node domain and an address, used for processing the MSI-X interrupt, in the working node domain specifically includes: enabling an A-LUT function of the NTB by using an A-LUT control register; selecting the A-LUT fragment, used for establishing the second mapping relationship, at the management node side of the NTB; and establishing the second mapping relationship by using the A-LUT fragment.

Further, the method performed by the apparatus when the processor 601 executes the computer executable instruction stored in the memory 602 further includes: obtaining a DMA address, allocated to the shared PCIe I/O device, in the management node domain, and a DMA address, allocated to the shared PCIe I/O device, in the working node domain; and establishing, by using the A-LUT fragment, a third mapping relationship between the DMA address, allocated to the shared PCIe I/O device, in the management node domain and the DMA address, allocated to the shared PCIe I/O device, in the working node domain.

By means of this embodiment, mapping of a shared PCIe I/O device can be completed by using an A-LUT fragment, so that when a system is initialized, a size of an A-LUT fragment and a quantity of A-LUT fragments can be determined according to a quantity of sharable PCIe I/O devices, and a size of a BAR is determined. Not only the size of the BAR can be determined quite easily and accurately, but also occupation of relatively large memory space can be avoided by setting a relatively small BAR in general cases.

A person skilled in the art may clearly understand that, the technologies in the embodiments of the present invention may be implemented by software in addition to a necessary general hardware platform. Based on such an understanding, the technical solutions of the present invention essentially or the part contributing to the prior art may be implemented in a form of a software product. The software product is stored in a memory medium, such as a ROM/RAM, a hard disk, or an optical disc, and includes several instructions for instructing a computer device (which may be a personal computer, a server, or a network device) to perform the methods described in the embodiments or some parts of the embodiments of the present invention.

The embodiments in this specification are all described in a progressive manner, for same or similar parts in the embodiments, reference may be made to these embodiments, and each embodiment focuses on a difference from other embodiments. Especially, apparatus and system embodiments are basically similar to a method embodiment, and therefore are described briefly; for related parts, reference may be made to partial descriptions in the method embodiment.

The foregoing descriptions are implementation manners of the present invention, but are not intended to limit the protection scope of the present invention. Any modification, equivalent replacement, and improvement made without departing from the spirit and principle of the present invention shall fall within the protection scope of the present invention.

What is claimed is:

1. A method for sharing peripheral component interconnect express (PCIe) input/output (I/O) devices, wherein the method comprises:
   determining a PCIe I/O device to be shared in a PCIe interconnection system;
   establishing, using a base address register (BAR) at a working node on one side of a non-transparent bridge (NTB), a first mapping relationship between an address of a control and status register (CSR) of the PCIe I/O device to be shared in a management node domain and an address for processing the CSR in a working node domain;
   enabling an address lookup table (A-LUT) function of the NTB;
   establishing, using an A-LUT fragment at a management node on an other side of the NTB, a second mapping relationship between an address for receiving a message-signaled interrupts extended (MSI-X) interrupt of the PCIe I/O device to be shared in the management node domain and an address for processing the MSI-X interrupt in the working node domain; and
   initializing a configuration of the NTB, the initializing comprising:
      determining a size of the A-LUT fragment and a quantity of A-LUT fragments according to a quantity of shared PCIe I/O devices in the PCIe interconnection system; and
      setting a size of the BAR according to the size of the A-LUT fragment and the quantity of A-LUT fragments.

2. The method according to claim 1, wherein the determining the PCIe I/O device to be shared in the PCIe interconnection system comprises:
   obtaining the address of the CSR of the PCIe I/O device to be shared in the management node domain and the address for receiving the MSI-X interrupt of the PCIe I/O device to be shared in the management node domain; and
   obtaining the address for processing the CSR in the working node domain and the address for processing the MSI-X interrupt in the working node domain.

3. The method according to claim 1, wherein establishing the second mapping relationship between the address for receiving the MSI-X interrupt of the PCIe I/O device to be shared in the management node domain and the address for processing the MSI-X interrupt in the working node domain comprises:
   selecting the A-LUT fragment for establishing the second mapping relationship; and
   establishing the second mapping relationship using the A-LUT fragment.

4. The method according to claim 3, further comprises:
   obtaining a direct memory access (DMA) address allocated to the PCIe I/O device to be shared in the management node domain and a DMA address allocated to the PCIe I/O device to be shared in the working node domain; and
   establishing, using the A-LUT fragment, a third mapping relationship between the DMA address allocated to the PCIe I/O device to be shared in the management node domain and the DMA address allocated to the PCIe I/O device to be shared in the working node domain.

5. An apparatus for sharing peripheral component interconnect express (PCIe) input/output (I/O) devices, wherein the apparatus comprises:
   a memory configured to store instructions; and
   a processor coupled to the memory and configured to execute the instructions to:
      determine a PCIe I/O device to be shared in a PCIe interconnection system;
      establish, using a base address register (BAR) at a working node on one side of a non-transparent bridge (NTB), a first mapping relationship between an address of a control and status register (CSR) of the PCIe I/O device to be shared in a management node domain and an address for processing the CSR in a working node domain;
      enable an address lookup table (A-LUT) function of the NTB;
      establish, using an A LUT fragment at a management node on an other side of the NTB, a second mapping relationship between an address for receiving a message-signaled interrupts extended (MSI-X) interrupt of the PCIe I/O device to be shared in the management node domain and an address for processing the MSI-X interrupt in the working node domain; and
      initialize a configuration of the NTB, comprising:
         determine a size of the A-LUT fragment and a quantity of A-LUT fragments according to a quantity of shared PCIe I/O devices in the PCIe interconnection system; and
         set a size of the BAR according to the size of the A-LUT fragment and the quantity of A-LUT fragments.

6. The apparatus according to claim 5, wherein the processor is further configured to execute the instructions to:
   obtain the address of the CSR of the PCIe I/O device to be shared in the management node domain and the address for receiving the MSI-X interrupt of the PCIe I/O device to be shared in the management node domain; and
   obtain the address for processing the CSR in the working node domain and the address for processing the MSI-X interrupt in the working node domain.

7. The apparatus according to claim 5, wherein the processor is further configured to execute the instructions to:
   select the A-LUT fragment for establishing the second mapping relationship; and
   establish the second mapping relationship using the A-LUT fragment.

8. The apparatus according to claim 7, wherein the processor is further configured to execute the instructions to:
   obtain a direct memory access (DMA) address allocated to the PCIe I/O device to be shared in the management node domain and a DMA address allocated to the PCIe I/O device to be shared in the working node domain; and
   establish, using the A-LUT fragment, a third mapping relationship between the DMA address allocated to the PCIe I/O device to be shared in the management node domain and the DMA address allocated to the PCIe I/O device to be shared in the working node domain.

9. A peripheral component interconnect express (PCIe) input/output (I/O) interconnection system, wherein the PCIe I/O interconnection system comprises:
   a working node;
   a management node; and
   a non-transparent bridge (NTB);
   wherein one of the working node and the management node is configured to:
      determine a shared PCIe I/O device in a PCIe interconnection system;
      establish, using a base address register (BAR) at the working node on one side of the non-transparent bridge (NTB), a first mapping relationship between an address of a control and status register (CSR) of the shared PCIe I/O device in a management node domain and an address used processing the CSR in a working node domain;
      establish, using an address lookup table (A-LUT) fragment at the management node on an other side of the NTB, a second mapping relationship between an address for receiving a message-signaled interrupts extended (MSI-X) interrupt of the shared PCIe I/O device in the management node domain and an address for processing the MSI-X interrupt, in the working node domain; and
      initialize a configuration of the NTB, comprising:
         determine a size of the A-LUT fragment and a quantity of A-LUT fragments according to a quantity of shared PCIe I/O devices in the PCIe interconnection system; and
         set a size of the BAR according to the size of the A-LUT fragment and the quantity of A-LUT fragments.

10. The system according to claim 9, wherein one of the working node and the management node is configured to:
   obtain the address of the CSR of the shared PCIe I/O device in the management node domain and the address for receiving the MSI-X interrupt of the shared PCIe I/O device in the management node domain; and
   obtain the address for processing the CSR, in the working node domain and the address for processing the MSI-X interrupt in the working node domain.

11. The system according to claim 9, wherein one of the working node and the management node is configured to:
   select the A-LUT fragment for establishing the second mapping relationship; and
   establish the second mapping relationship using the A-LUT fragment.

12. The system according to claim 11, wherein one of the working node and the management node is configured to:
   obtain a direct memory access (DMA) address allocated to the shared PCIe I/O device in the management node domain and a DMA address allocated to the shared PCIe I/O device in the working node domain; and
   establish, using the A-LUT fragment, a third mapping relationship between the DMA address allocated to the shared PCIe I/O device in the management node domain and the DMA address allocated to the shared PCIe I/O device in the working node domain.

* * * * *